United States Patent
Chavez et al.

(10) Patent No.: US 8,019,078 B2
(45) Date of Patent: Sep. 13, 2011

(54) PHONE CALL MUTE NOTIFICATION

(75) Inventors: Timothy R. Chavez, Austin, TX (US);
Jacob D. Eisinger, Austin, TX (US);
Jennifer E. King, Austin, TX (US);
William A. Reichert, III, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1089 days.

(21) Appl. No.: 11/778,872

(22) Filed: Jul. 17, 2007

(65) Prior Publication Data
US 2009/0022305 A1 Jan. 22, 2009

(51) Int. Cl.
*H04M 1/00* (2006.01)
(52) U.S. Cl. .................... 379/421; 379/207.02
(58) Field of Classification Search ............ 379/202.01, 379/207.02, 388.03, 421, 163, 164, 201, 379/373.01, 393; 455/174.1, 194.1, 212, 455/416
See application file for complete search history.

(56) References Cited

U.S. PATENT DOCUMENTS

| | | | |
|---|---|---|---|
| 5,202,916 A | 4/1993 | Oliver | |
| 5,469,508 A | 11/1995 | Vallier | |
| 5,987,106 A | 11/1999 | Kitamura | |
| 5,995,827 A * | 11/1999 | Gitlin et al. | 455/416 |
| 6,216,011 B1 | 4/2001 | Wierzbicki et al. | |
| 6,754,342 B1 * | 6/2004 | Surazski et al. | 379/421 |
| 6,870,919 B2 | 3/2005 | Dobler | |
| 7,020,292 B1 | 3/2006 | Heubel et al. | |
| 2002/0116541 A1 | 8/2002 | Parker et al. | |
| 2003/0185371 A1 * | 10/2003 | Dobler | 379/207.02 |
| 2006/0146990 A1 * | 7/2006 | Wagner et al. | 379/67.1 |
| 2006/0193459 A1 * | 8/2006 | Cadiz et al. | 379/211.02 |
| 2006/0280295 A1 * | 12/2006 | Runcie | 379/88.26 |
| 2007/0021145 A1 | 1/2007 | Lam | |
| 2008/0268802 A1 * | 10/2008 | Ricard et al. | 455/179.1 |

* cited by examiner

*Primary Examiner* — MD S Elahee
*Assistant Examiner* — Akelaw Teshale
(74) *Attorney, Agent, or Firm* — Stephen R. Tkacs; Stephen J. Walder, Jr.; Steven L. Bennett (57) ABSTRACT

A phone call mute notification applies an aural effect to the user's speech, other parties' speech, non-speech, or combinations thereof. The phone call mute notification does not render speech unintelligible and may provide a constant indication that the phone call mute function is active. Furthermore, the phone call mute notification does not serve as a distraction to the user, because the aural effect may be applied to speech itself rather than drawing the attention of the user away from the speech.

15 Claims, 5 Drawing Sheets

PHONE CALL MUTE NOTIFICATION

BACKGROUND

1. Technical Field

The present application relates generally to an improved data processing system and method. More specifically, the present application is directed to a mechanism for phone call mute notification.

2. Description of Related Art

When a person participates in a telephone call, the person may mute his or her end of the call. For example, when there is an interruption, the user of the telephone device may activate a mute function, which turns off the microphone in the telephone device or in the muting device such as a conference center or a computer in a Voice over Internet Protocol (VoIP) device. The parties on the other end of the call will not hear the audio occurring on the user's end until the user deactivates the mute function.

Often, the user may activate the mute function and forget that the mute function is activated. In this instance, the user may attempt to participate in the conversation, but the other parties will not hear the audio due to the mute function being activated. This may be a source of embarrassment for the user or frustration for all parties.

Known solutions to this problem include sounding a periodic beep on the speaker of the telephone device or a flashing light to indicate that the mute function is activated. The user may then see or hear this indication, which will prompt the user to deactivate the mute function before attempting to participate in the conversation. However, with a periodic beep, the user may attempt to talk between beeps, not realizing that the mute function is activated. Also, the beep may interrupt the audio coming from the other parties. If the user has his or her eyes focused on something during the conversation, he or she may not notice a flashing light. Otherwise, the user may find a periodic beep or flashing light to be a distraction during the conversation.

SUMMARY

The illustrative embodiments recognize the disadvantages of the prior art and provide a mechanism for phone call mute notification. When a user mutes a call, the mechanism applies an aural effect, such as flange or phase shifting, for example, to the caller's voice, the called party's voice, silence, or any combination thereof. Thus, the caller may be alerted to the fact that the call is muted without making the call incoherent or incomprehensible. The mechanism may exist in a telephone device, such as a telephone, a mobile phone, Internet Protocol (IP) telephone device, IP telephone server, public switch, private branch exchange, or the like.

In one illustrative embodiment, a method for phone call mute notification in a device comprises receiving audio for a telephone conversation and responsive to a mute function being active, applying an aural effect to the audio.

In one exemplary embodiment the audio is at least one of a user's speech or another party's speech. In a further exemplary embodiment, the aural effect is at least one of modulation, flange, or phase shifting.

In another exemplary embodiment, the audio is silence or non-speech. In a further exemplary embodiment, the aural effect is one of white noise or sound generation.

In still another exemplary embodiment, the device is one of a telephone device, a conference center, a public switch, a private branch exchange, or an Internet telephony server. In yet another exemplary embodiment, applying the aural effect to the audio comprises applying the aural effect based on user preferences.

In another illustrative embodiment, a system for phone call mute notification comprises a processor and a memory coupled to the processor. The memory contains instructions which, when executed by the processor, cause the processor to receive audio for a telephone conversation and responsive to a mute function being active, apply an aural effect to the audio.

In one exemplary embodiment, the audio is at least one of a user's speech or another party's speech. In a further exemplary embodiment, the aural effect is at least one of modulation, flange, or phase shifting.

In another exemplary embodiment, the audio is silence or non-speech. In a further exemplary embodiment, the aural effect is one of white noise or sound generation.

In yet another exemplary embodiment, the system is one of a telephone device, a conference center, a public switch, a private branch exchange, or an Internet telephony server. In still another exemplary embodiment, applying the aural effect to the audio comprises applying the aural effect based on user preferences. In one exemplary embodiment, the processor is a digital signal processor.

In a further illustrative embodiment, a computer program product comprises a computer useable medium having a computer readable program. The computer readable program, when executed on a computing device, causes the computing device to receive audio for a telephone conversation and responsive to a mute function being active, apply an aural effect to the audio.

In one exemplary embodiment, the audio is at least one of a user's speech or another party's speech and wherein the aural effect is at least one of modulation, flange, or phase shifting. In another exemplary embodiment, the audio is silence or non-speech and wherein the aural effect is one of white noise or sound generation. In still another exemplary embodiment, the computing device is one of a telephone device, a conference center, a public switch, a private branch exchange, or an Internet telephony server. In yet another exemplary embodiment, applying the aural effect to the audio comprises applying the aural effect based on user preferences.

These and other features and advantages of the present invention will be described in, or will become apparent to those of ordinary skill in the art in view of, the following detailed description of the exemplary embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION OF THE ILLUSTRATIVE EMBODIMENTS

Figure 1:
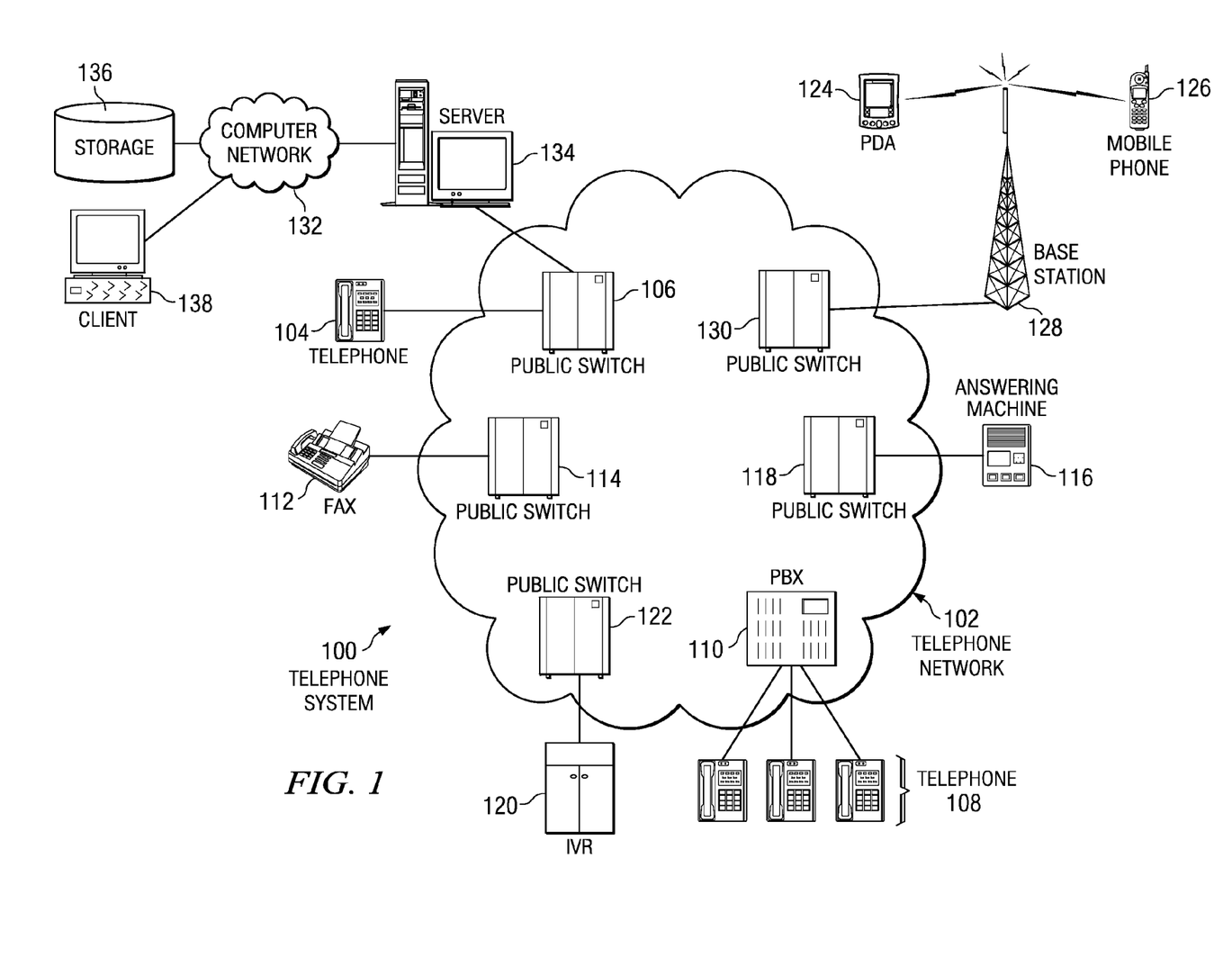
FIG. 1 depicts a pictorial representation of a telephone system in which illustrative embodiments may be implemented.
Figure 2:
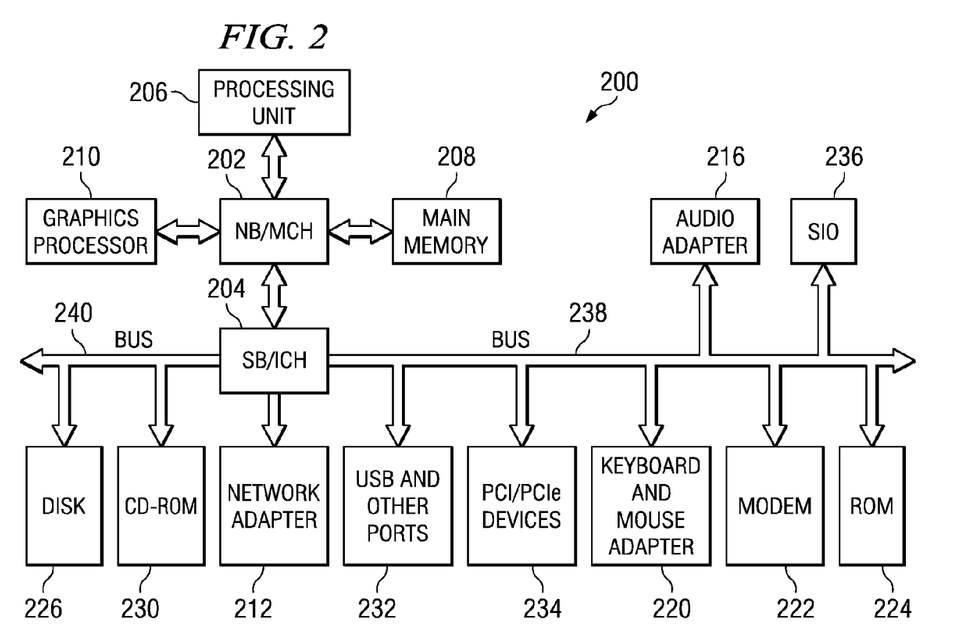
FIG. 2 is a block diagram of an exemplary data processing system in which aspects of the illustrative embodiments may be implemented.

The illustrative embodiments provide a mechanism for phone call mute notification. With reference now to the figures and in particular with reference to FIGS. 1 and 2, exemplary diagrams of data processing environments are provided in which illustrative embodiments of the present invention may be implemented. It should be appreciated that FIGS. 1 and 2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a telephone system in which illustrative embodiments may be implemented. Telephone system 100 is a network of telephone devices and/or computers in which illustrative embodiments may be implemented. Telephone system 100 contains telephone network 102, which is the medium to provide telephonic communications between various telephone devices connected together in telephone system 100. Telephone network 102 may include connections, such as wired communication links, wireless communications links, satellite communication links, fiber optic cables, and the like.

In the depicted example, telephone 104 is connected to telephone network 102 via public switch 106. A public switch is a large-scale computer system that is used to switch telephone calls, which are comprised of analog or digital data streams. Switches used to connect customers to the telephone networks are known as end office switches. End office switches may be connected together within a telephone network through tandem switches, which do not deal directly with the customers.

Telephones 108 are connected to the telephone network via private branch exchange (PBX) 110. A PBX is an in-house telephone switching system that interconnects telephone extensions to each other, as well as to an outside telephone network, such as telephone network 102. A PBX may include functions such as least cost routing for outside calls, call forwarding, conference calling and call accounting. Modern PBXs use all-digital methods for switching and may support both digital terminals and telephones, along with analog telephones. Telephones 108 may also be configured in a business environment with a voice mail system (not shown). PBX 110 may be connected to the telephone network by a public switch (not shown).

Fax machine 112 may be connected to the telephone network by public switch 114 and answering machine 116 may be connected to the telephone network by public switch 118. Furthermore, interactive voice response (IVR) system 120 may be connected to the telephone network by public switch 122. An IVR system is an automated telephone answering system that responds with a voice menu and allows the user to make choices and enter information via the keypad or spoken input. IVR systems are widely used in call centers as well as a replacement for human switchboard operators. The system may also integrate database access and fax response. IVR system 120 may be used to answer telephone calls at a store or business, provide business information, such as hours of operation and directions, and to direct calls to intended recipients or a voice mail system. Alternatively, IVR system 120 may be connected to the telephone network through a PBX, such as PBX 110.

Personal digital assistant (PDA) 124 and mobile telephone 126 may communicate with telephone network 102 using wireless technology. PDA 124 and mobile telephone 126 communicate with base station radio tower 128. The base station connects the caller with the telephone network through public switch 130. Base station 128 may cover a small geographic area referred to as a cell. A cellular telephone system includes many base stations, each covering a cell that only slightly overlaps adjacent cells at the borders. Therefore, telephone system 100 may include many such base stations and public switches to serve a large geographic area if base station 128 is part of a cellular system. PDA 124 and mobile telephone 126 may communicate with base station 128 through various means, such as satellite communications, analog or digital cellular communications, radio frequency transmission, or the like.

A person of ordinary skill in the art will recognize that the configuration of telephone system 100 shown by example in FIG. 1 will vary depending upon implementation. For example, telephone system 100 may include any number of public switches and private branch exchanges connected to telephone network 102, each connected to any combination of telephones, answering machines, facsimile machines, IVR systems, a LAN and other telephone devices known in the art.

As previously mentioned above, illustrative embodiments provide a mechanism for phone call mute notification. When a caller mutes a call, the mechanism applies an aural effect, such as flange or phase shifting, for example, to the caller's voice, the called party's voice, silence, or any combination thereof. Thus, the caller may be alerted to the fact that the call is muted without making the call incoherent or incomprehensible. The mechanism may exist in a telephone device, such as telephone 104, telephones 108, mobile telephone 126, PDA 124, or Internet Protocol (IP) telephone device or software at client 138. Alternatively, aspects of the illustrative embodiments may exist within server 134, public switch 106, 114, 118, 122, or 130, or PBX 110.

With reference now to FIG. 2, a block diagram of an exemplary data processing system is shown in which aspects of the illustrative embodiments may be implemented. Data processing system 200 is an example of a computer, such as client 138, server 134, PDA 124, mobile telephone 126, telephone 104, IVR 120, telephones 108, public switches 106, 114, 118, 122, and 130, or PBX 110 in FIG. 1, in which computer usable code or instructions implementing the processes for illustrative embodiments of the present invention may be located.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash binary input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java is a trademark of Sun Microsystems, Inc. in the United States, other countries, or both).

As a server, data processing system 200 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device which is configured with flash memory to provide non-volatile memory for storing operating system files and/or user-generated data, for example. Essentially, data processing system 200 may be any known or later developed data processing system without architectural limitation.

Figure 3:
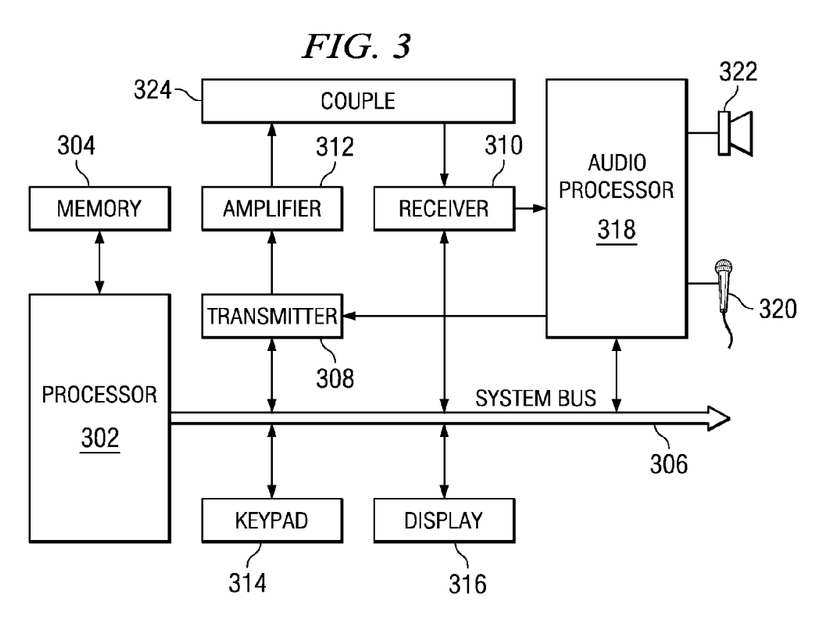
FIG. 3 is a block diagram of a hardware configuration of a telephone device in accordance with an illustrative embodiment.

With reference now to FIG. 3, a block diagram of a hardware configuration of a telephone device is depicted in accordance with an illustrative embodiment. The telephone device includes processor 302 for controlling operation of the telephone device and memory 304. Processor 302 may be a general-purpose microprocessor operating under the control of instructions stored in a memory, such as memory 304, or device-specific circuitry for controlling the operation of the telephone device. Processor 302 is connected by system bus 306 to transmitter 308, receiver 310, keypad 314, display 316, and audio processor 318. Keypad 314 may be a physical keypad or a virtual keypad provided via a touch sensitive display and may include function buttons, pointing device controls, or other user interface peripheral elements commonly known in the art. Display 316 may include a liquid crystal display (LCD), plasma display, or other known type of display, such as a cathode ray tube, active matrix display, or the like.

Transmitter 308 and receiver 310 are coupled to a telephone signal by couple 324 to provide full duplex communication. The telephone signal may be provided by a telephone line (not shown) in a land-based telephone or an antenna in a wireless telephone. Audio processor 318 provides basic analog audio outputs to speaker 322 and accepts analog audio inputs from microphone 320. Received signals are demodulated and decoded by receiver 310. Transmitter 308 encodes and modulates signals passed to it by processor 302 or audio processor 318. The output of the transmitter is amplified by power amplifier 312 to control the power level at which the signal is transmitted.

Those of ordinary skill in the art will appreciate that the hardware depicted in FIG. 3 is only exemplary and no limitation is intended or implied by the depiction in FIG. 3. Many modifications to the telephone device shown in FIG. 3 may be made without departing from the spirit and scope of the present invention.

The user may activate a mute function. In accordance with the illustrative embodiments, when the mute function is activated, processor 302 or audio processor 318 may perform the operations for applying an aural effect, such as flange or phase shifting, for example, to the caller's voice, the called party's voice, silence, or any combination thereof. Thus, the caller may be alerted to the fact that the call is muted without making the call incoherent or incomprehensible.

Figure 4A:
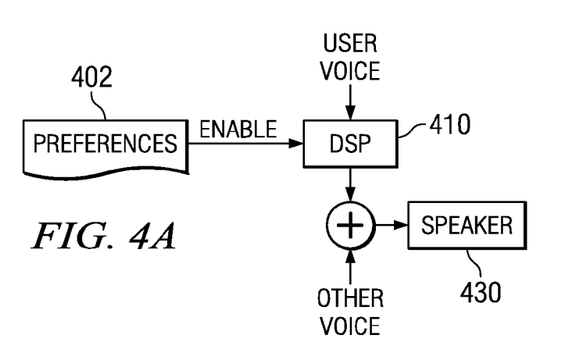
FIGS. 4A-4C depict functional components of a mechanism for phone call mute notification in accordance with illustrative embodiments.
Figure 4B:
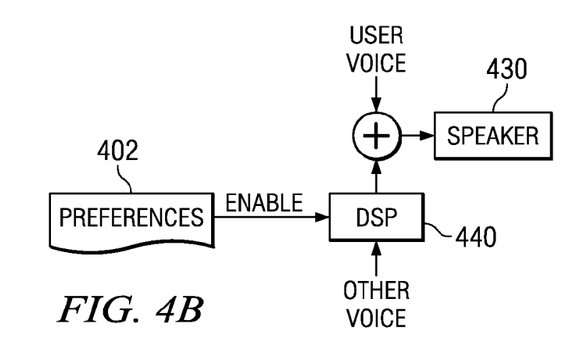
Figure 4C:
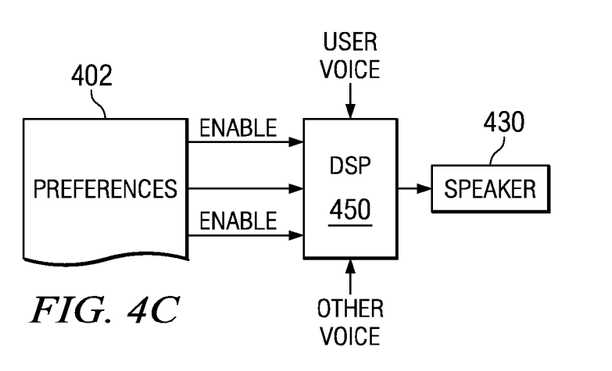

FIGS. 4A-4C depict functional components of a mechanism for phone call mute notification in accordance with illustrative embodiments. More particularly, with reference to FIG. 4A, digital signal processor (DSP) 410 receives the user's voice or other audio received in the microphone of the user's telephone device. DSP 410 may be implemented, for example, as code running on processor 302, code running on audio processor 318, a hardware component of audio processor 318, or a dedicated hardware component not shown in FIG. 3.

DSP 410 also receives an enable signal. If the enable signal is asserted and the mute function is activated, DSP 410 applies an aural effect to the user's voice. The user's modified voice audio and the other voice audio received from other participants of the conversation are then outputted to speaker 430. Thus, if the mute function is activated, the user hears his or her own voice with an aural effect, such as modulation, flange, or phase shifting, for example.

The enable signal may be asserted based on user preferences 402. Thus, using preferences 402, the user may enable or disable the mute notification mechanism. Preferences 402 may be stored in memory 304, for example. Processor 302 may then control the assertion or de-assertion of the enable signal based on the user's preferences. In an alternative embodiment, the user may select a particular aural effect to apply to the user's voice using preferences 402.

With reference now to FIG. 4B, digital signal processor (DSP) 440 receives the other participants' voice or other audio received from other participants of the conversation. DSP 440 may be implemented, for example, as code running on processor 302, code running on audio processor 318, a hardware component of audio processor 318, or a dedicated hardware component not shown in FIG. 3.

DSP 440 also receives an enable signal. If the enable signal is asserted and the mute function is activated, DSP 440 applies an aural effect to the other parties' audio. The modified audio and the user's voice are then outputted to speaker 430. Thus, if the mute function is activated, the user hears the voice of the other participants with an aural effect, such as modulation, flange, or phase shifting, for example.

The enable signal may be asserted based on user preferences 402. Thus, using preferences 402, the user may enable or disable the mute notification mechanism. Preferences 402 may be stored in memory 304, for example. Processor 302 may then control the assertion or de-assertion of the enable signal based on the user's preferences. In an alternative embodiment, the user may select a particular aural effect to apply to the user's voice using preferences 402.

Turning to FIG. 4C, digital signal processor (DSP) 450 receives the user's voice or other audio received in the microphone of the user's telephone device and the other participants' voice or other audio received from other participants of the conversation. DSP 450 may be implemented, for example, as code running on processor 302, code running on audio processor 318, a hardware component of audio processor 318, or a dedicated hardware component not shown in FIG. 3.

DSP 450 also receives an enable signal for the user's voice and an enable signal for the other parties' voice. If the mute function is activated, DSP 450 applies an aural effect to the user's voice or the other parties' voice based on the enable signals. The modified audio is then outputted to speaker 430. Thus, if the mute function is activated and the enable signal for the user's voice is asserted, the user hears his or her own voice with an aural effect, such as modulation, flange, or phase shifting, for example. If the mute function is activated and the enable signal for the other parties' audio is asserted, the user hears the voice of the other parties with an aural effect. In an alternative embodiment, DSP 450 may apply an effect to the audio only when no speech is detected. Thus, DSP 450 may detect whether there is speech present in user voice audio or other voice audio and only apply the audio effect when no speech is detected. Speech detection algorithms, components, and mechanisms are well-known in the art.

The enable signals may be asserted based on user preferences 402. Thus, using preferences 402, the user may enable or disable the mute notification mechanism altogether or may enable or disable the audio effect on the user's voice, the other voice, or silence individually. Preferences 402 may be stored in memory 304, for example. Processor 302 may then control the assertion or de-assertion of the enable signals based on the user's preferences. In an alternative embodiment, the user may select a particular aural effect to apply to the audio using preferences 402.

Figure 5A:
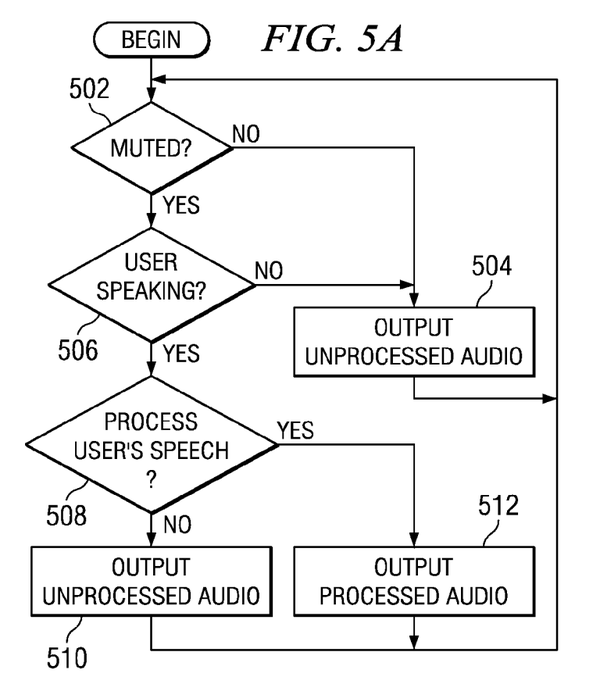
FIGS. 5A-5C are flowcharts illustrating operation of a phone call mute notification in accordance with illustrative embodiments.
Figure 5B:
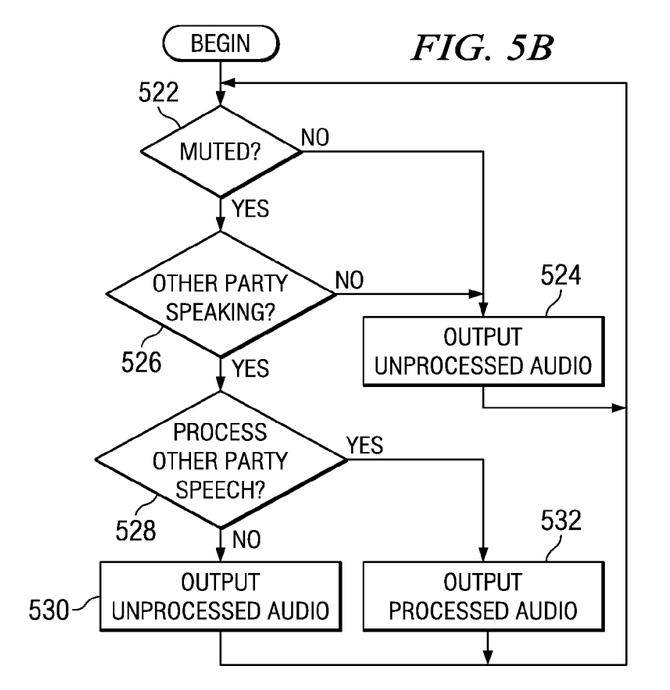
Figure 5C:
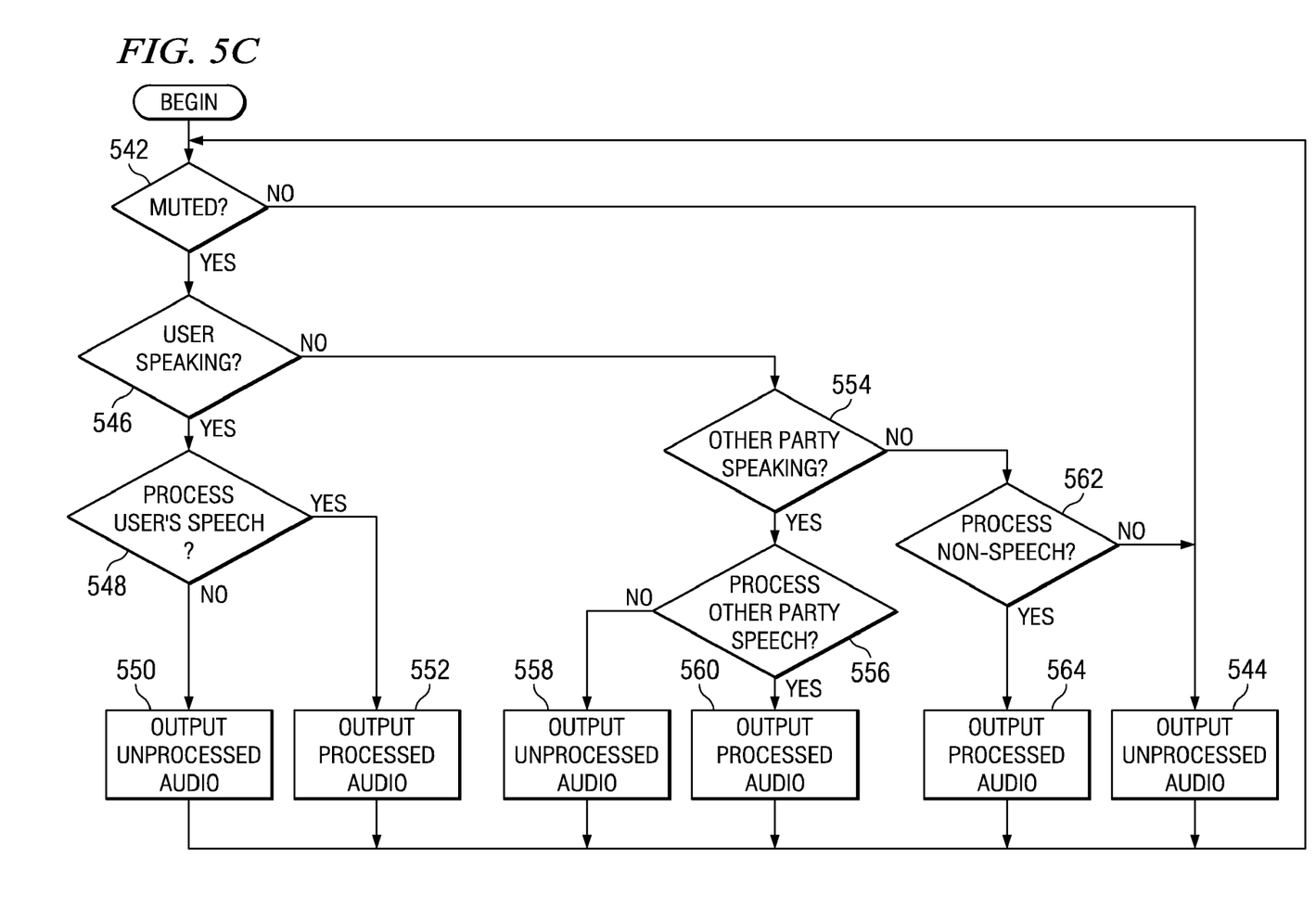

FIGS. 5A-5C are flowcharts illustrating operation of a phone call mute notification in accordance with illustrative embodiments. It will be understood that each block of the flowchart illustrations, and combinations of blocks in the flowchart illustrations, can be implemented by computer program instructions. These computer program instructions may be provided to a processor or other programmable data processing apparatus to produce a machine, such that the instructions which execute on the processor or other programmable data processing apparatus create means for implementing the functions specified in the flowchart block or blocks. These computer program instructions may also be stored in a computer-readable memory or storage medium that can direct a processor or other programmable data processing apparatus to function in a particular manner, such that the instructions stored in the computer-readable memory or storage medium produce an article of manufacture including instruction means which implement the functions specified in the flowchart block or blocks.

Accordingly, blocks of the flowchart illustrations support combinations of means for performing the specified functions, combinations of steps for performing the specified functions and program instruction means for performing the specified functions. It will also be understood that each block of the flowchart illustrations, and combinations of blocks in the flowchart illustrations, can be implemented by special purpose hardware-based computer systems which perform the specified functions or steps, or by combinations of special purpose hardware and computer instructions.

Furthermore, the flowcharts are provided to demonstrate the operations performed within the illustrative embodiments. The flowcharts are not meant to state or imply limitations with regard to the specific operations or, more particularly, the order of the operations. The operations of the flowcharts may be modified to suit a particular implementation without departing from the spirit and scope of the present invention.

With reference now to FIG. 5A, a flowchart illustrating operation of a mechanism for phone call mute notification by applying an aural effect to the user's speech in accordance with an illustrative embodiment. Operation begins and the mechanism determines whether the phone call is muted by the user (block 502). If the phone call is not muted, the mechanism outputs unprocessed audio (block 504), and operation returns to block 502 to determine whether the phone call is muted.

If the phone call is muted in block 502, the mechanism determines whether the user of the device is speaking (block 506). The user may be the user of a particular telephone device who is speaking and in control of the mute function in which the mechanism is implemented. However, the mechanism may be implemented in another device, such as an IP telephony server, a public switch, conference center, or a PBX, for example. In such case, the user may be a user for which telephone service is provided. If the user is not speaking, the mechanism outputs unprocessed audio (block 504), and operation returns to block 502 to determine whether the phone call is muted. Speech detection algorithms and circuits are well-known in the art. The mechanism may detect any audio coming from the user's microphone above a certain threshold as speech. Alternatively, the mechanism may detect certain patterns of audio that are recognized as spoken language or may detect spleen language or audible sounds that are not background noise.

If the user is speaking in block 506, the mechanism determines whether to process the user's speech (block 508). The mechanism may make this determination by checking whether phone call mute notification is enabled in the user's preferences, for example. If the mechanism determines that phone call mute notification is not enabled, the mechanism outputs unprocessed audio (block 510). Thereafter, operation returns to block 502 to determine whether the phone call is muted.

If the mechanism determines that phone call mute notification is enabled in block 508, the mechanism outputs processed audio (block 512). Thereafter, operation returns to block 502 to determine whether the phone call is muted. The mechanism may output processed audio by applying an aural effect to the user's voice. This aural effect may be modulation, flange, echo, no echo (silence), or phase shifting, for example. The amount and delay of echo may be specified in the user's preferences. The aural effect may simply modify the sound of the user's voice without rendering the speech unintelligible. Thus, the phone call mute notification is not likely to disrupt or distract from the conversation; however, the user will easily recognize that the mute function is enabled.

In the depicted example, operation loops through these blocks applying the aural effect to the user's voice to indicate that the mute function is activated if phone call mute notification is enabled and outputting unprocessed audio otherwise. Operation of the flowchart may end at any time if the phone call session is ended. Furthermore, in this illustrative embodiment, the aural effect is applied only to the user's voice. However, the aural effect may be applied to only the other parties' voice, only to silence, to all audio, or any combination thereof, as will be seen below.

With reference now to FIG. 5B, a flowchart illustrating operation of a mechanism for phone call mute notification by applying an aural effect to speech of other parties in accordance with an illustrative embodiment. Operation begins and the mechanism determines whether the phone call is muted by the user (block 522). If the phone call is not muted, the mechanism outputs unprocessed audio (block 524), and operation returns to block 522 to determine whether the phone call is muted.

If the phone call is muted in block 522, the mechanism determines whether another party is speaking (block 526). Another party may be a user other than the user of a particular telephone device in which the mechanism is implemented. The mechanism may distinguish between the other party's speech, which may be received from the telephone network. If another party is not speaking, the mechanism outputs unprocessed audio (block 524), and operation returns to block 522 to determine whether the phone call is muted. Speech detection algorithms and circuits are well-known in the art. The mechanism may detect any audio coming from the other party above a certain threshold as speech. Alternatively, the mechanism may detect certain patterns of audio that are recognized as spoken language.

If another party is speaking in block 526, the mechanism determines whether to process the other party's speech (block 528). The mechanism may make this determination by checking whether phone call mute notification is enabled in the user's preferences, for example. If the mechanism determines that phone call mute notification is not enabled, the mechanism outputs unprocessed audio (block 530). Thereafter, operation returns to block 522 to determine whether the phone call is muted.

If the mechanism determines that phone call mute notification is enabled in block 528, the mechanism outputs processed audio (block 532). Thereafter, operation returns to block 522 to determine whether the phone call is muted. The mechanism may output processed audio by applying an aural effect to the other party's voice. This aural effect may be modulation, flange, or phase shifting, for example. The aural effect may simply modify the sound of the other party's voice without rendering the speech unintelligible. Thus, the phone call mute notification is not likely to disrupt or distract from the conversation; however, the user will easily recognize that the mute function is enabled.

In the depicted example, operation loops through these blocks applying the aural effect to the other parties' voice to indicate that the mute function is activated if phone call mute notification is enabled and outputting unprocessed audio otherwise. Operation of the flowchart may end at any time if the phone call session is ended.

Turning to FIG. 5C, a flowchart illustrating operation of a mechanism for phone call mute notification by applying an aural effect to the user's speech, the other parties' speech, or silence in accordance with an illustrative embodiment. Operation begins and the mechanism determines whether the phone call is muted by the user (block 542). If the phone call is not muted, the mechanism outputs unprocessed audio (block 544), and operation returns to block 542 to determine whether the phone call is muted.

If the phone call is muted in block 542, the mechanism determines whether the user of the device is speaking (block 546). The user may be the user of a particular telephone device in which the mechanism is implemented. However, the mechanism may be implemented in another device, such as an IP telephony server, a public switch, or a PBX, for example. In such case, the user may be a user for which telephone service is provided. Speech detection algorithms and circuits are well-known in the art. The mechanism may detect any audio coming from the user's microphone above a certain threshold as speech. Alternatively, the mechanism may detect certain patterns of audio that are recognized as spoken language.

If the user is speaking in block 546, the mechanism determines whether to process the user's speech (block 548). The mechanism may make this determination by checking whether phone call mute notification is enabled for the user's speech in the user's preferences, for example. If the mechanism determines that phone call mute notification is not enabled for the user's speech, the mechanism outputs unprocessed audio (block 550). Thereafter, operation returns to block 542 to determine whether the phone call is muted.

If the mechanism determines that phone call mute notification is enabled for the user's speech in block 548, the mechanism outputs processed audio (block 552). Thereafter, operation returns to block 542 to determine whether the phone call is muted. The mechanism may output processed audio by applying an aural effect to the user's voice. This aural effect may be modulation, flange, or phase shifting, for example. The aural effect may simply modify the sound of the user's voice without rendering the speech unintelligible. Thus, the phone call mute notification is not likely to disrupt or distract from the conversation; however, the user will easily recognize that the mute function is enabled.

If the user is not speaking in block 546, the mechanism determines whether another party is speaking (block 554). If another party is speaking in block 554, the mechanism determines whether to process the other party's speech (block 556). The mechanism may make this determination by checking whether phone call mute notification is enabled for other parties in the user's preferences, for example. If the mechanism determines that phone call mute notification is not enabled for other parties, the mechanism outputs unprocessed audio (block 558). Thereafter, operation returns to block 542 to determine whether the phone call is muted.

If the mechanism determines that phone call mute notification is enabled for other parties in block 556, the mechanism outputs processed audio (block 560). Thereafter, operation returns to block 542 to determine whether the phone call is muted.

If the user is not speaking in block 546 and another party is not speaking in block 554, then there is a period of silence or non-speech. The mechanism determines whether to process non-speech (block 562). The mechanism may make this determination by checking whether phone call mute notification is enabled for non-speech in the user's preferences, for example. If the mechanism determines that phone call mute notification is not enabled for non-speech, the mechanism outputs unprocessed audio (block 544), and operation returns to block 542 to determine whether the phone call is muted.

If the mechanism determines that phone call mute notification is enabled for non-speech, the mechanism outputs processed audio (block 564). Thereafter, operation returns to block 542 to determine whether the phone call is muted. The mechanism may output processed audio by applying an aural effect to the non-speech audio. This aural effect may be modulation, flange, or phase shifting, for example. The aural effect may simply modify the sound of the silence or other non-speech audio to generate an audible indication that the mute function is activated. Thus, the phone call mute notification is not likely to disrupt or distract from the conversation; however, the user will easily recognize that the mute function is active.

In the depicted example, operation loops through these blocks applying the aural effect to the user's voice, the other parties' voice, non-speech, or any combination thereof to indicate that the mute function is active if phone call mute notification is enabled and outputting unprocessed audio otherwise. Operation of the flowchart may end at any time if the phone call session is ended.

In one particular implementation, the mechanism may enable phone call mute notification for non-speech only. Thus, when there is a period of silence or non-speech, the user will hear a flange, white noise, or effect on the non-speech audio. However, when the user or another party speaks, the audio is output without the aural effect. Therefore, all speech is audible and intelligible, while non-speech gives the user an indication that the mute function is enabled. In another implementation, all audio may have an aural effect applied. Alternatively, the user may choose to have one aural effect applied to the user's speech and a different aural effect applied to the other parties' speech. Other modifications may be made without departing from the spirit and scope of the present invention.

Thus, the illustrative embodiments solve the disadvantages of the prior art by providing a phone call mute notification that applies an aural effect to the user's speech, other parties' speech, non-speech, or combinations thereof. The phone call mute notification does not render speech unintelligible and may provide a constant indication that the phone call mute function is active. Furthermore, the phone call mute notification does not serve as a distraction to the user, because the aural effect may be applied to speech itself rather than drawing the attention of the user away from the speech.

It should be appreciated that the illustrative embodiments may take the form of an entirely hardware embodiment, an entirely software embodiment or an embodiment containing both hardware and software elements. In one exemplary embodiment, the mechanisms of the illustrative embodiments are implemented in software, which includes but is not limited to firmware, resident software, microcode, etc.

Furthermore, the illustrative embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read-only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method for phone call mute notification in a device, the method comprising:

enabling a mute function for a first party in a telephone conversation;

responsive to detecting speech of the first party, determining whether mute notification is enabled based on user preferences;

responsive to the mute notification being enabled for the first party, applying a first aural effect to the speech of the first party;

responsive to detecting speech of a second party in the telephone conversation, determining whether mute notification for speech of other parties is enabled based on the user preferences;

responsive to the mute notification for speech of other parties being enabled, applying a second aural effect to the speech of the second party;

responsive to detecting silence, determining whether mute notification for silence is enabled based on the user preferences; and responsive to the mute notification for silence being enabled, applying a third aural effect to the silence; and wherein the third aural effect is one of white noise or sound generation.

2. The method of claim 1, wherein the first aural effect is at least one of modulation, flange, or phase shifting.

3. The method of claim 1, wherein the second aural effect is at least one of modulation, flange, or phase shifting.

4. The method of claim 1, wherein the device is one of a telephone device, a conference center, a public switch, a private branch exchange, or an Internet telephony server.

5. A system for phone call mute notification, the system comprising:

a processor; and a memory coupled to the processor, wherein the memory contains instructions which, when executed by the processor, cause the processor to:

enabling a mute function for a first party in a telephone conversation;

responsive to detecting speech of the first party, determining whether mute notification is enabled based on user preferences;

responsive to the mute notification being enabled for the first party, applying a first aural effect to the speech of the first party;

responsive to detecting speech of a second party in the telephone conversation, determining whether mute notification for speech of other parties is enabled based on the user preferences;

responsive to the mute notification for speech of other parties being enabled, applying a second aural effect to the speech of the second party;

responsive to detecting silence, determining whether mute notification for silence is enabled based on the user preferences; and responsive to the mute notification for silence being enabled, applying a third aural effect to the silence and wherein the third aural effect is one of white noise or sound generation.

6. The system of claim 5, wherein the first aural effect is at least one of modulation, flange, or phase shifting.

7. The system of claim 5, wherein the second aural effect is at least one of modulation, flange, or phase shifting.

8. The system of claim 5, wherein the system is one of a telephone device, a conference center, a public switch, a private branch exchange, or an Internet telephony server.

9. The system of claim 5, wherein the processor is a digital signal processor.

10. A computer program product comprising a computer useable non-transitory storage medium having a computer readable program stored thereon, wherein the computer readable program, when executed on a computing device, causes the computing device to:

enabling a mute function for a first party in a telephone conversation;

responsive to detecting speech of the first party, determining whether mute notification is enabled based on user preferences;

responsive to the mute notification being first aural effect to the speech of the first party;

responsive to detecting speech of a second party in the telephone conversation, determining whether mute notification for speech of other parties is enabled based on the user preferences;

responsive to the mute notification for speech of other parties being enabled, applying a second aural effect to the speech of the second party;

responsive to detecting silence, determining whether mute notification for silence is enabled based on the user preferences; and responsive to the mute notification for silence being enabled, applying a third aural effect to the silence and wherein the third aural effect is one of white noise or sound generation.

11. The computer program product of claim 10, wherein the first aural effect is at least one of modulation, flange, or phase shifting.

12. The computer program product of claim 10, wherein the second aural effect is one of white noise or sound generation.

13. The computer program product of claim 10, wherein the computing device is one of a telephone device, a conference center, a public switch, a private branch exchange, or an Internet telephony server.

14. The computer program product of claim 10, wherein applying the aural effect to the audio comprises applying the aural effect based on user preferences.

15. The computer program product of claim 10, wherein the second aural effect is at least one of modulation, flange, or phase shifting.

* * * * *